(12) United States Patent  (10) Patent No.: US 7,685,399 B2
Garrison  (45) Date of Patent: Mar. 23, 2010

(54) METHOD, SYSTEM, AND COMPUTER PROGRAM PRODUCTS FOR DATA MOVEMENT WITHIN PROCESSOR STORAGE

(75) Inventor: Glen E. Garrison, Wallkill, NY (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 11/620,676

(22) Filed: Jan. 7, 2007

(65) Prior Publication Data

US 2008/0168253 A1  Jul. 10, 2008

(51) Int. Cl.
G06F 12/00 (2006.01)
G06F 13/00 (2006.01)

(52) U.S. Cl. ............... 711/202; 711/100; 711/154; 711/106

(58) Field of Classification Search ............... 711/100, 711/154, 200, 202, 203, 205, 206
See application file for complete search history.

(56) References Cited

U.S. PATENT DOCUMENTS

| | | | |
|---|---|---|---|
| 5,247,629 A | 9/1993 | Casamatta et al. | |
| 5,317,704 A | 5/1994 | Izawa et al. | |
| 5,752,275 A * | 5/1998 | Hammond | 711/207 |
| 5,953,520 A | 9/1999 | Mallick | |
| 6,044,445 A | 3/2000 | Tsuda et al. | |
| 7,383,414 B2 * | 6/2008 | Lee et al. | 711/206 |
| 2001/0044880 A1 | 11/2001 | Franaszek et al. | |
| 2003/0110205 A1 | 6/2003 | Johnson | |
| 2004/0123069 A1 | 6/2004 | Franaszek et al. | |
| 2004/0158596 A1 | 8/2004 | Fujiki | |

* cited by examiner

*Primary Examiner*—Tuan V. Thai
(74) *Attorney, Agent, or Firm*—Cantor Colburn LLP; William Kinnaman, Jr.

(57) ABSTRACT

A method for moving the data between the memory addresses in a computer system in which data referenced by memory addresses is stored in physical memory. The method comprises providing a translation mechanism for mapping respective pages of contiguous memory addresses to corresponding locations in the physical memory in accordance with a specified mapping, whereby a first page of memory addresses is mapped to a first location in the physical memory and a second page of memory addresses is mapped to a second location in the physical memory; and changing the specified mapping of the translation mechanism to a new mapping in which the second page of memory addresses is mapped to the first location in the physical memory, thereby effectively moving the data stored at the first location from the first page of memory addresses to the second page of memory addresses without moving the data between locations in the physical memory.

16 Claims, 9 Drawing Sheets

METHOD, SYSTEM, AND COMPUTER PROGRAM PRODUCTS FOR DATA MOVEMENT WITHIN PROCESSOR STORAGE

BACKGROUND

1. Field of the Invention

Embodiments of the invention relate to systems which can directly manipulate pages of memory by modifying a Translation Table (TT) associated with the dynamically allocated main memory.

2. Discussion of the Related Art

In computer systems it is customary that there be a one-to-one correspondence between a memory address produced by a processor and a specific area in a physical memory of a system. It is an error for the processor to request access to an address which does not have an associated physical memory area. This limits the operating system (OS) and applications to an address space determined by the actual physical memory installed in the system. Modern computer systems have overcome this limitation through the use of virtual memory that implements a Translation Table (TT) to map program addresses to real memory addresses.

With virtual memory the program works in an address space limited only by processor architecture. It is a function of the OS to ensure that data and code of a program is in main memory and that the TT can map the virtual address to the real address correctly.

In a virtual memory system, the allocation of memory is most commonly performed by operating system software. This requires an interrupt of an instruction sequence so that privileged kernel code can allocate physical memory to the area being accessed so that normal program flow can continue without error. This interrupt and the kernel processing to allocate physical memory require a significant amount of processing time and upset the normal pipelining of instructions through a central processing unit (CPU).

However, in a computing system that has introduced a central storage mechanism which increases the maximum amount of central storage in the system above a previously architected limit, such as the IBM z/OS operating system, the majority of applications that run on that system are not able to easily take advantage of the additional central storage.

The z/OS operating system is a 64-bit server operating system from IBM. It is the successor to the IBM mainframe operating system OS/390, combining Multiple Virtual Storage (MVS) and UNIX System Services (a POSIX-compliant mainframe implementation of UNIX formerly known as MVS Open Edition). z/OS is a highly secure, scalable, high-performance enterprise operating system on which to build and deploy Internet and Java-enabled applications or legacy applications, providing a comprehensive and diverse application execution environment.

An important feature of new software products is the ability to work with a company's legacy applications, or at least be able to import data from them. In information technology, legacy applications and data are those that have been inherited from languages, platforms, and techniques earlier than current technology. Most enterprises that utilize computers have legacy applications and databases that serve critical business needs.

In the case being addressed here, these legacy applications function based on old architectural limits of central storage addressability. Under certain circumstances, these legacy applications place "constraint" on the management of central storage up to the old architected limit disproportionate to the system's central storage as a whole.

Therefore, in the software operating system (e.g., IBM z/OS) there exists a need to design a means to specifically handle disproportionate "constraint" placed on a central storage below the old limit. This mechanism must also perform its function with maximization of efficiency to minimize the intrusion of the operating system with regard to the number of machine "cycles" used to perform the function. The more cycles consumed by the operating system, the fewer cycles that are available to the customer's applications being used to achieve the customer's business goals.

During the new legacy storage relief process considerable central processing unit (CPU) resources are expended when the legacy storage becomes constrained. Under severe constraint conditions the result can be movement of thousands of pages per second from legacy frames to high frames (central storage in the addressing range beyond the previously architected limit.)

Considering the fact that the movement must copy bits and bytes from one physical storage location to another it is no surprise that the result is high CPU consumption.

Consequently, it would be highly desirable to provide a computer system that uses dynamically allocated physical memory and a Translation Table (TT) for managing this memory and a mechanism for performing these page operations without requiring the use of the processor. It would also be desirable to successfully manage disproportionate "constraint" placed on the central storage, minimize the number of machine "cycles" used to perform functions and minimize CPU consumption and to present a system that has the ability to virtually remove physical storage from the computing environment.

SUMMARY OF THE INVENTION

Embodiments of the invention include a method and computer program product for moving data between memory addresses in a computer system in which data referenced by memory addresses is stored in physical memory. The method comprises providing a translation mechanism for mapping respective pages of contiguous memory addresses to corresponding locations in the physical memory in accordance with a specified mapping, whereby a first page of memory addresses is mapped to a first location in the physical memory and a second page of memory addresses is mapped to a second location in the physical memory; and changing the specified mapping of the translation mechanism to a new mapping in which the second page of memory addresses is mapped to the first location in the physical memory, thereby effectively moving the data stored at the first location from the first page of memory addresses to the second page of memory addresses without moving the data between locations in the physical memory.

Another embodiment of the invention is a computing system for performing data page operations, the computing system including a physical memory in which data referenced by memory addresses is stored; a processing device for generating one or more real addresses associated with memory locations of the physical memory for reading and writing data; a translation mechanism for mapping respective pages of contiguous memory addresses to corresponding locations in the physical memory in accordance with a specified mapping, whereby a first page of memory addresses is mapped to a first location in the physical memory and a second page of memory addresses is mapped to a second location in the physical memory; the translation mechanism changing the specified mapping to a new mapping in which the second page of memory addresses is mapped to the first location in the physical memory, thereby effectively moving the data stored at the first location from the first page of memory addresses to the second page of memory addresses without moving the data between locations in the physical memory.

BRIEF DESCRIPTION OF THE DRAWINGS

Further features, aspects and advantages of the apparatus and methods of the embodiments of the invention will become better understood with regard to the following description, appended claims, and accompanying drawings where:

DESCRIPTION OF EXEMPLARY EMBODIMENTS

Figure 1:
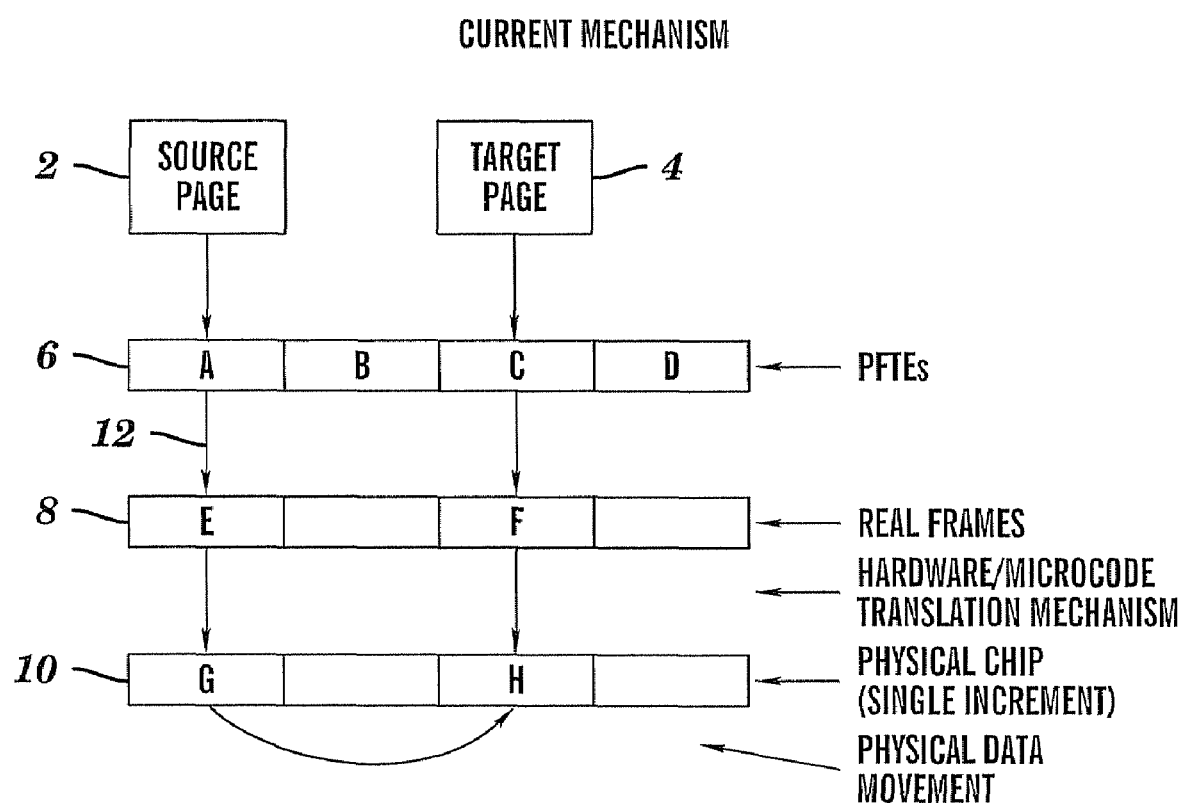
FIG. 1 depicts the currently functioning mechanism in use by many computing systems requiring the physical movement of bits and bytes from one physical storage location to another.

This application relates to data processing systems and in particular to data processing systems that dynamically allocate main memory for use by an operating system and/or application software. Embodiments of the invention relate to a translation mechanism that includes a Translation Table (TT) associated with dynamically allocating main memory. More specifically, embodiments of the invention have a second TT for disconnecting a logical computer address from a first physical address and reconnecting the logical computer address to a second physical address for accomplishing what appears to be data movement when no data movement really occurs.

The embodiments of the invention provide for a computer system that uses dynamically allocated physical memory and a Translation Table (TT) for managing this memory, a mechanism for performing the page operations without requiring intervention of the processor.

The embodiments of the invention disconnect two real addresses from their physical chip locations and point each of the disconnected physical addresses to the other chip location. Moreover, the embodiments of the invention maintain a single copy of data for use by all processors. This is accomplished by what appears to be data movement when no data movement really occurs.

In order to understand the functionality of the embodiments of the invention, an introduction on Processor Resource/System Manager (PR/SM) and Logical Partitioning (LPAR) is given below.

A physical server may be partitioned into multiple logical servers. This feature, known as Logical Partitioning (LPAR), allows up to fifteen logical servers to be configured within one physical server.

Processors such as the IBM System/390 (S/390) processor and its follow-ons, the zSeries and System z9 processors, have a hardware partitioning capability called Processor Resource/System Manager (PR/SM). Each logical partition can be isolated from all other logical partitions. Each logical partition runs its own z/OS or other operating system and its own workload. Each logical partition appears to the software running on it as one or more logical processors having the same instruction set architecture (ISA) as the underlying physical processors. While the present invention is not limited to any particular ISA, in the description that follows it will be assumed that each such logical processor executes (except for the new instruction described below) in accordance with z/Architecture as defined, for example, in *z/Architecture Principles of Operation*, SA22-7832-04 (September 2005). As described in that publication, each architected central processing unit (CPU) contains, among other facilities, 16 general purpose registers, which may be used to specify operands as described further below.

Processor Resource/Systems Manager (PR/SM) hardware circuits and microcode are built into IBM System/390 and follow-on mainframes and support logical partitions (LPARs). LPARs are a logical segmentation of a mainframe's memory and other resources that allow it to run its own copy of the operating system and associated applications. LPARs are caused by special hardware circuits and microcode and allow multiple system images to run in one machine. This can be multiple instances of the same operating system or different operating systems.

LPARs allow the running of multiple system images on a single processor complex. Each such image has a full complement of CPUs (dedicated or shared), central storage, expanded storage and channels. PR/SM is a hardware (microcode) facility that permits one to partition a physical server into several logical servers (LPARs). PR/SM maps/schedules individual operating system instances to separate CPUs or time slices them to a single CPU.

In a PR/SM capable computer each LPAR has its own set of real addresses ranging from address zero to the maximum real address allowed for the amount of physical chip storage allocated to that particular LPAR. Also, the LPAR capable machine has the ability to dynamically reconfigure central storage from one LPAR to another with the same single physical computer.

This reconfiguration takes a physical chip location, which was assigned one real address on one LPAR, and assigns that physical chip location to the other LPAR, possibly giving it a completely different real address on the receiving LPAR. This capability works at the storage increment level and relies on the presence of a second translation mechanism within the machine, which translates a real or absolute address, as surfaced to the operating system, to a physical chip location in accordance with a mapping defined by a second translation table.

The translation from real address to chip location is done via this second translation mechanism, which works at the storage increment level. For example, a real address range starting at a storage increment boundary is translated to some chip location at the chip's storage increment boundary. By employing this translation mechanism the machine is capable of taking a single physical chip storage increment range and reassigning a different range of real storage addresses to that physical increment.

When an application attempts to access a storage location the machine translates the virtual storage location to a real storage location via dynamic address translation (DAT).

With the real storage address in hand the machine then manipulates the real address to obtain the storage increment number that particular real address is associated with by consulting the increment translation structure to determine the physical chip location and then uses the remaining bits in the real storage address as a displacement from the start of the physical chip's storage increment boundary to locate the precise chip location at which to perform the requested operation. For example, in a 31-bit addressing mode, a real storage address may consist of bits 1-31, with bit 1 being the most significant address bit and bit 31 being the most significant address bit. If we assume an increment size of 1 megabyte (MB) ($2^{20}$ bytes) and a page size of 4 kilobytes (KB) ($2^{12}$ bytes), then of these address bits, bits 1-11 may identify a particular 1 MB increment, bits 12-19 may identify a particular 4 KB page within the 1 MB increment, and bits 20-31 may identify a particular location within a 4 KB page.

The problem of the high cost of moving full real frames of data from one real frame to another can be resolved by reassigning real addresses from one physical chip location to another, at the real frame level, through the embodiments of the invention, which describe an additional vector table which sits below the increment (hardware/microcode) translation mechanism described below with reference to FIGS. 1-4.

In an indirectly addressed memory system, certain common operations may be performed by directly manipulating the entries in a translation table (TT), without actually accessing the data bytes. These types of operations are commonly performed on pages of memory. A page is the unit of allocation used by the virtual memory manager in the operating system to assign real memory resources to processes in the system. Virtual memory pages are usually a fixed size of a few thousand bytes, 4096 bytes being the most often-used page size. It is understood that the page of memory operated on may have any size, and embodiments of the invention are not limited to pages of 4096 bytes.

FIG. 1 depicts a mechanism for moving data from one physical chip location to another physical chip location at the real frame level prior to the embodiments of the invention.

FIG. 1 is used as a starting point for several examples of page operations. FIG. 1 depicts a source page 2 and a target page 4. Each of the page frame table entries (PFTEs) (A, B, C, D) is a software representation of a single real address on the system. Each PFTE has a one-to-one correspondence 12 with one of the frames of real storage 8 in the system/LPAR. In turn, each frame of real storage 8 has a one-to-one correspondence to an equivalent size page of physical chip storage 10 assigned to the system/LPAR. Specifically, in this embodiment the page frame table entries (PFTEs) 6 are one page.

The flow of a real frame reassignment is as follows. Element 8 denotes the real frames. When the operating system determines it needs to move data from one real frame E to another, it already has in place the mechanism to locate a second unused real frame F into which it can direct the data transfer. Once the two frames E, F are obtained, the bits and bytes are transferred from the source to the target physical chip locations using any of a number of computing instructions well known to those skilled in the art.

Once the instruction is issued, the microcode/hardware takes the real address, manipulates the real address to obtain the real address increment number corresponding to the input real address, then locates the correct displacement into the physical increment. Physical movement of data then takes place by transfer of data G to the storage location previously storing data H. As can be seen in FIG. 1 physical data movement occurs only in one physical chip (single increment) as shown by element 10. For the sake of simplicity, FIG. 1 shows a single physical storage increment. In reality there may well be any number of physical increments assigned to the system and physical data movement can take place from any location in any increment to any location in any other increment as well as transfer within the individual increments.) In other words, physical movement is the movement of data G into the storage location previously storing data H, as illustrated in FIG. 1.

Figure 5:
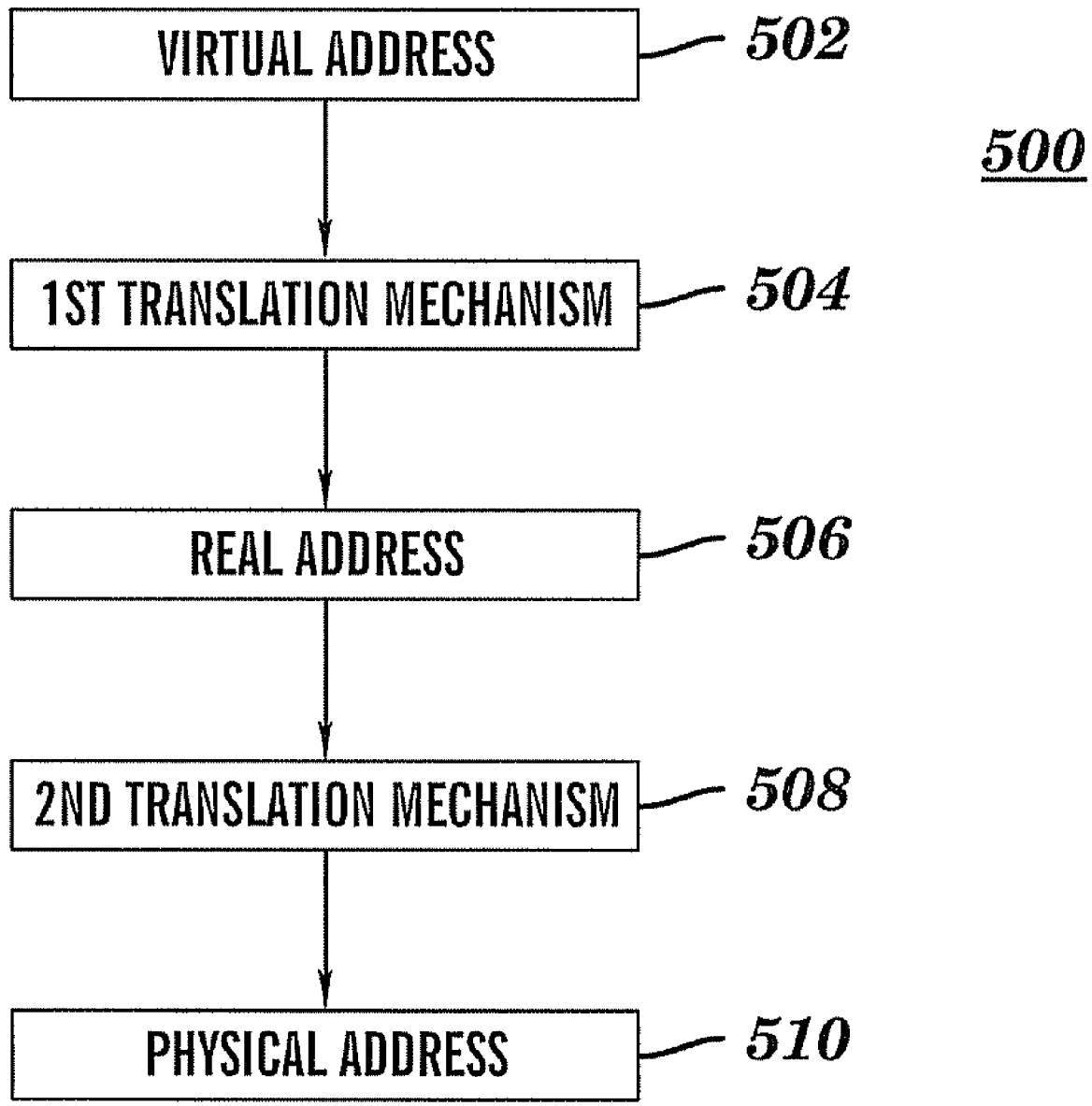
FIG. 5 shows the conventional translation from a virtual address to a real address and ultimately to a physical address.
Figure 6:
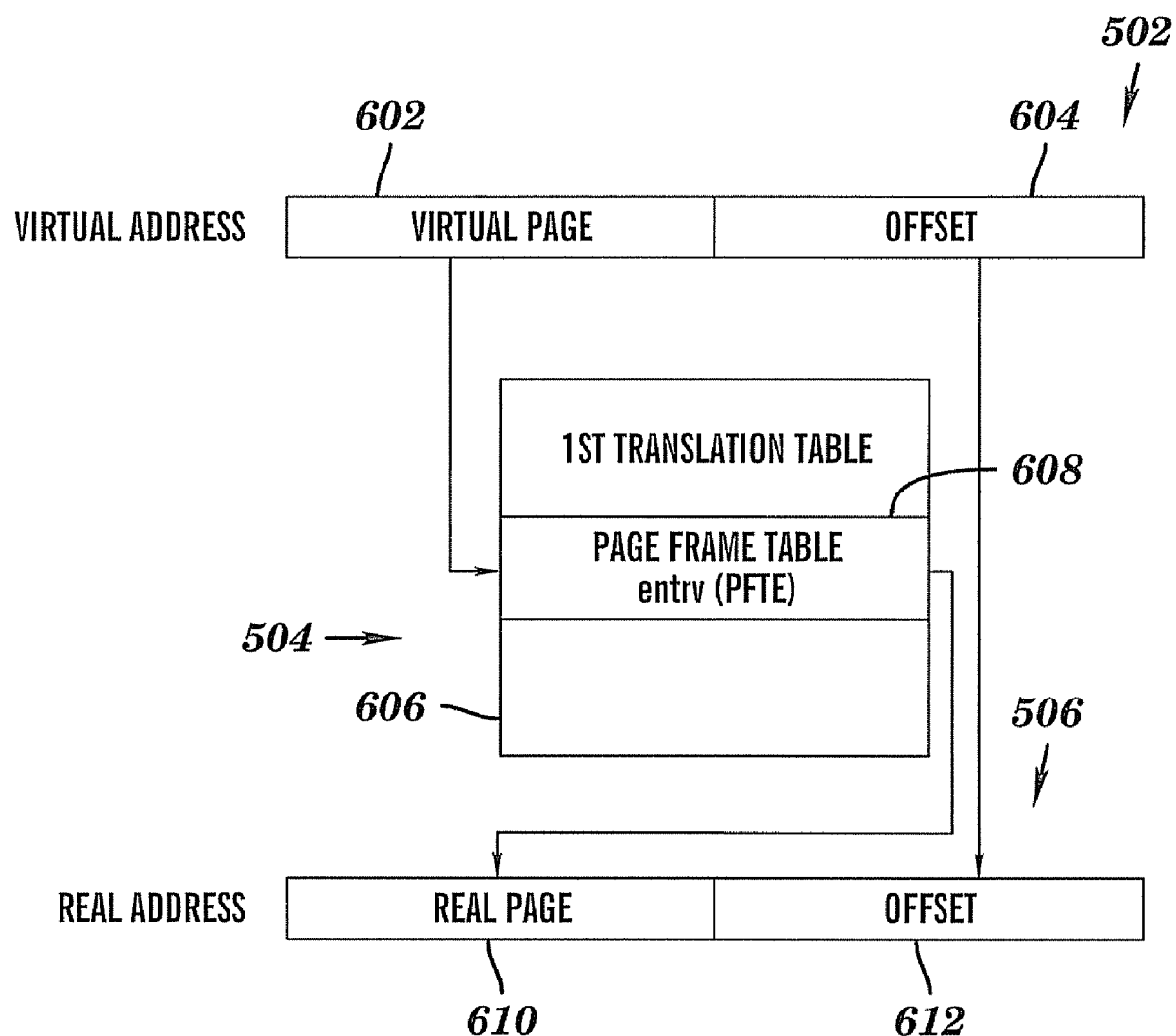
FIG. 6 shows the conventional translation from a virtual address to a real address.
Figure 7:
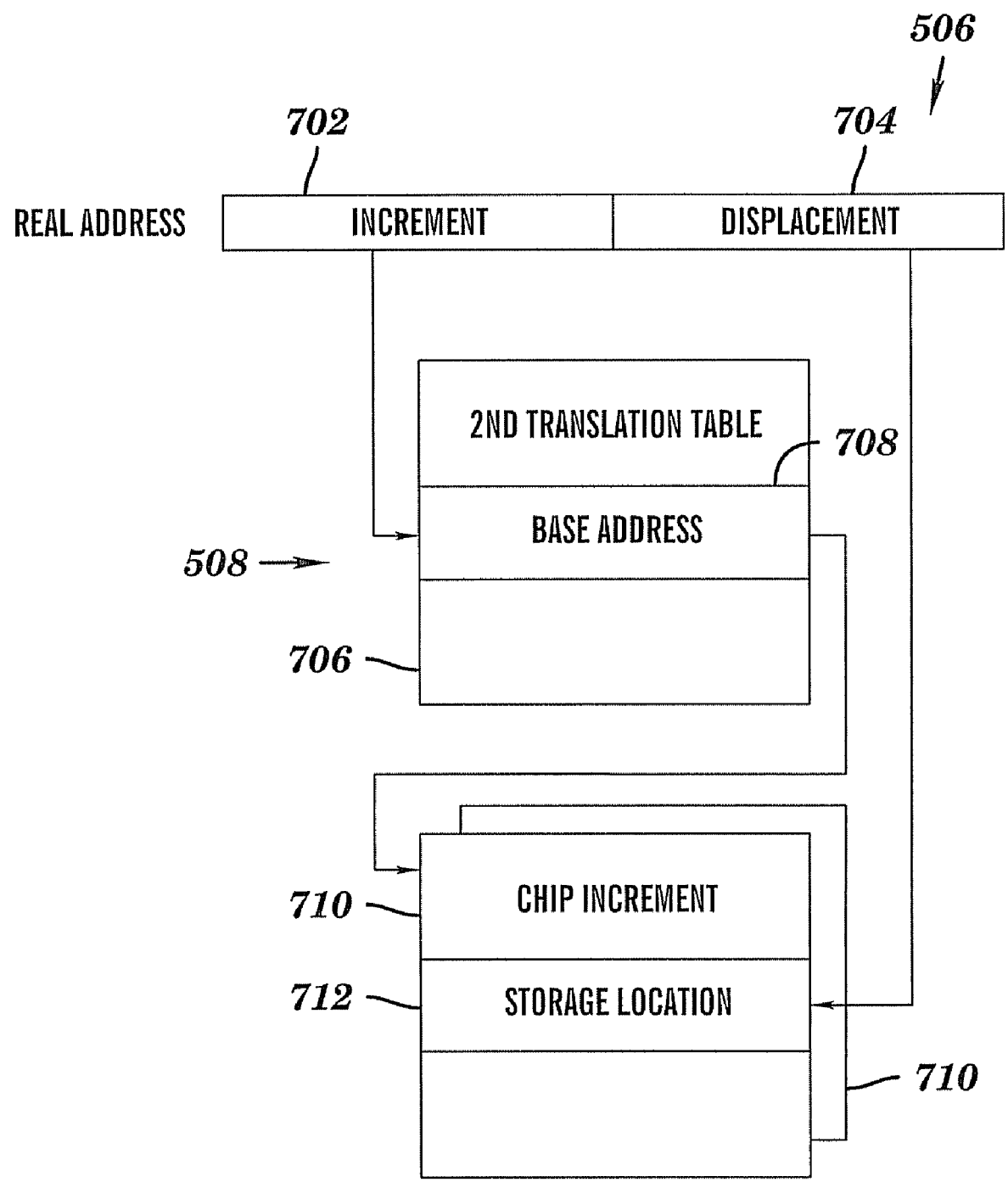
FIG. 7 shows the conventional translation from a real address to a physical address.

FIGS. 5-7 show the system of FIG. 1 in terms of its hardware translation structures. Thus, FIG. 5 shows a system 500 in which a virtual address 502 as understood by a program is transformed by a first translation mechanism 504 into a real address 506 as understood by the particular logical partition in which the program is running. Real address 506 is in turn translated by a second translation mechanism 508 into a physical address 510 representing the actual location of the data in physical storage.

FIG. 6 shows the virtual-to-real address translation step of FIG. 5 in more detail. Virtual address 506 may be regarded as being formed of a virtual page portion 602 and an offset portion 604. The virtual page portion 602, the higher-order address portion, indicates a particular page—a contiguous set of 4096, or $2^{12}$, bytes—in which the data is located in virtual address space. The offset portion 604, the lower-order address portion consisting of the 12 least significant bits (LSBs), indicates the byte offset of the data from the beginning of the page.

As also shown in FIG. 6, the first translation mechanism 504 comprises a first translation table 606 containing a plurality of page frame table entries (PFTEs) 608. Each such entry 608 indicates a corresponding real page (or real frame) corresponding to the virtual page, with virtual page portion 602 serving as an index into the table 606. The table entry 608 obtained in this manner is concatenated with the original byte offset 604 to produce a real address 506 comprising a page portion 610 and an offset portion 612. The granularity of virtual-to-real address translation is thus a page, consisting of 4096 (or $2^{12}$) bytes. In practice, several successive lookups are used to perform this virtual-to-real address translation in z/Architecture, but they can be represented logically by the single table 606.

Referring now to FIG. 7, a similar table lookup procedure is used to obtain the physical address 510 from the real address 508. For this purpose, real address 506 may be regarded as comprising a high-order increment portion 702 and a low-order displacement portion 704. The increment portion 702 indicates a particular physical chip increment 710 on which the data is stored (at a storage location 712). The increment portion 702 is used as an index into a second translation table 706 (implementing the second translation mechanism 506) used to look up the base address 708 of the chip increment 710. The displacement portion 704 represents the displacement (in bytes) of the storage location 712 from the base address 708 of the chip increment 710.

The particular dividing line between the increment portion 702 and the displacement portion 704 of the real address 506 depends on the size of the chip increment 710. For example, if the chip increment 710 has a size of 1 megabyte (i.e., $2^{20}$ bytes), then the displacement portion 704 would consist of the 20 LSBs of the real address 506, while the increment portion 702 would consist of the remaining bits of the real address. For chip increments 710 of different size, the increment portion 508 and the displacement portion 510 would vary in size correspondingly. Note that in contrast to the virtual-to-real address translation of FIG. 6, the granularity of this conventional real-to-physical address translation is basically the size of the chip increment 710, in this case 1 megabyte. Real pages thus cannot be arbitrarily relocated relative to one another in this conventional configuration unless they reside on different chip increments 710.

The present invention overcomes this limitation of conventional configurations by performing the real-to-physical address translation with the page granularity of the virtual-to-real address translation of FIG. 6. Pages of physical memory can thus be arbitrarily reassigned from one real page to another, enabling the movement of data from one real address to another without requiring any corresponding movement in physical memory. Rather than actual moving the data in physical memory, the real-to-physical translation tables are changed to reflect the address reassignment, as explained further below.

Figure 8:
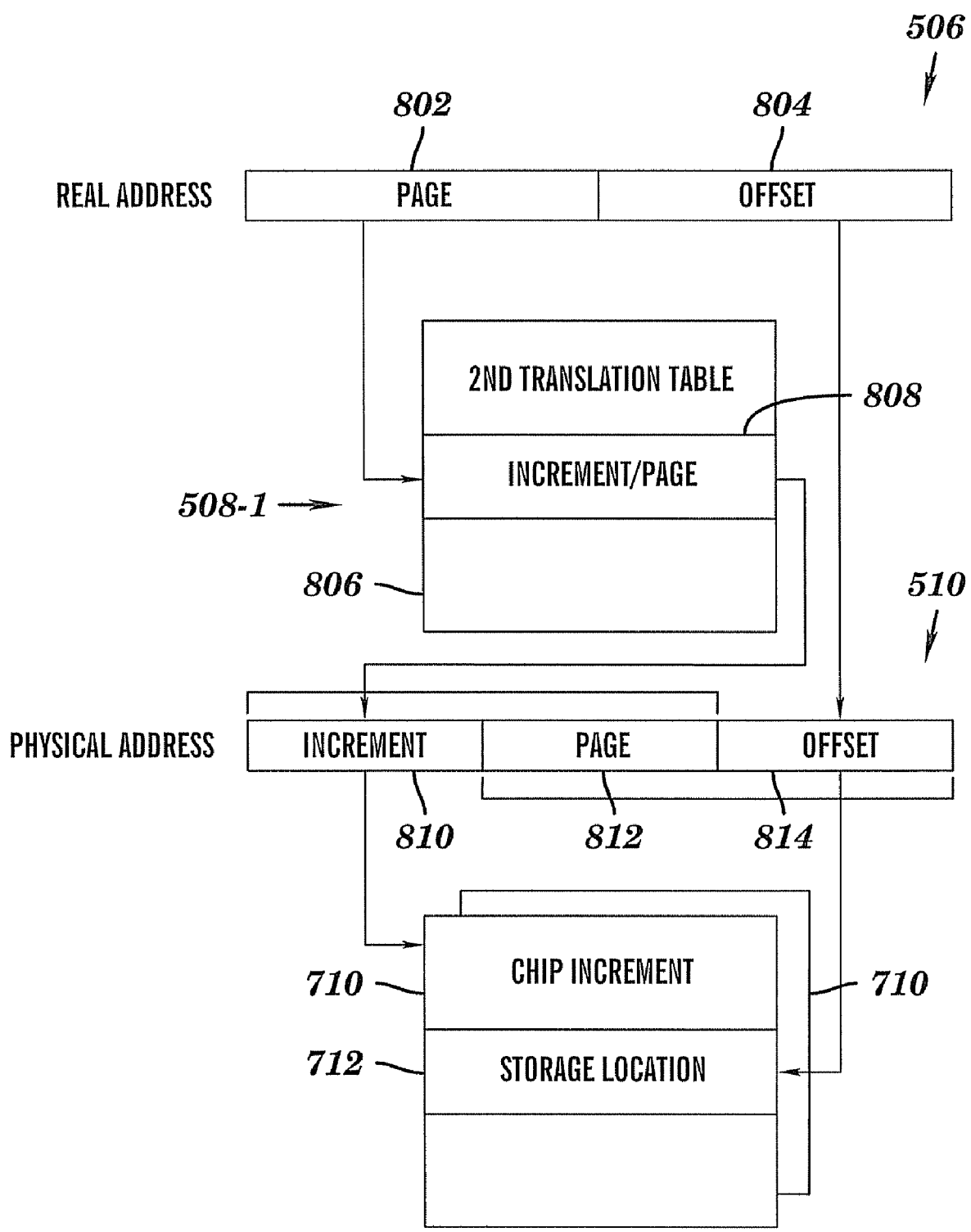
FIG. 8 shows the translation from a real address to a physical address in accordance with a first embodiment of the present invention.

FIG. 8 shows an address translation mechanism 508-1 for performing a real-to-physical address translation in accordance with the present invention. For this purpose, the real address 506 is analyzed into a high-order page portion 802 and a low-order offset portion 804, which are identical to the portions 610 and 612 shown in FIG. 6. Offset portion 804 contains the 12 LSBs of the real address 506, while page portion 802 contains the remaining bits of the real address.

Page portion 804 serves as an index into a second translation table 806 containing entries 808. In a manner similar to the PFTEs 608 in the first translation table 606 (FIG. 6), each entry 808 in the second translation table 806 indicates an increment portion 810 and a page portion 812 of the physical address 510, which also contains an offset portion 814. Increment portion 810 points to (i.e., contains the base address of) a particular physical increment 710 on which the data is stored (at storage location 712). Page portion 812 indicates the particular 4096-byte page (not separately shown) within that increment 710 within which the data is stored, while offset portion 814 (which is the same as offset portion 804 of the real address 506) represents the byte offset of the data within the particular page. Page portion 812 is concatenated with offset portion 814 to form an index into the increment 710 to access storage location 712. Note that in contrast to the conventional configuration shown in FIG. 7, successive real pages in this configuration of the invention can be arbitrarily mapped to different physical pages, even on different chip increments 710.

Figure 9:
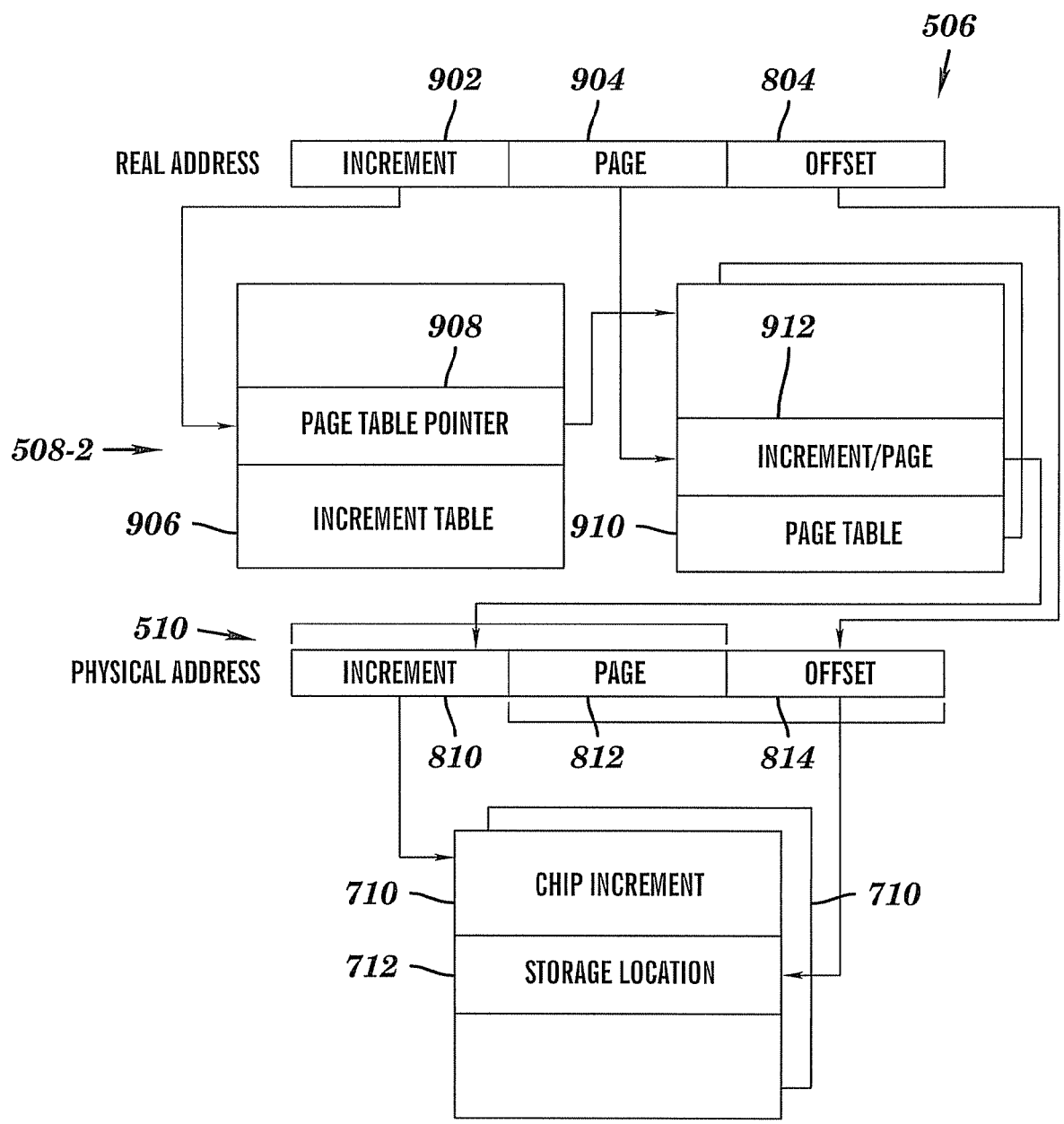
FIG. 9 shows the translation from a real address to a physical address in accordance with a second embodiment of the present invention.

FIG. 9 shows an alternative address translation mechanism 508-2 for performing a real-to-physical address translation in accordance with the present invention. From the standpoint of the overall real-to-physical address translation, translation mechanism 508-2 operates in a manner similar to that of the translation mechanism 508-1 shown in FIG. 8. However, translation mechanism 508-2 differs from translation mechanism 508-1 by using two successive translation tables to perform the lookup. For this purpose, the page portion 804 (FIG. 8) of real address 506 is further analyzed into an increment portion 902 and a page portion 904. Increment portion 902 serves as an index into an increment table 906 containing entries 908, each of which points to (i.e., stores the base address of) a page table 910. Each page table 910 in turn contains entries 912 that are similar to the entries 808 in page table 806 (FIG. 8) and are used in a similar manner to generate a physical address 510. Except for this use of two tables, the operation of the translation mechanism 508-2 is the same as for the translation mechanism 508-1 shown in FIG. 8.

Figure 2:
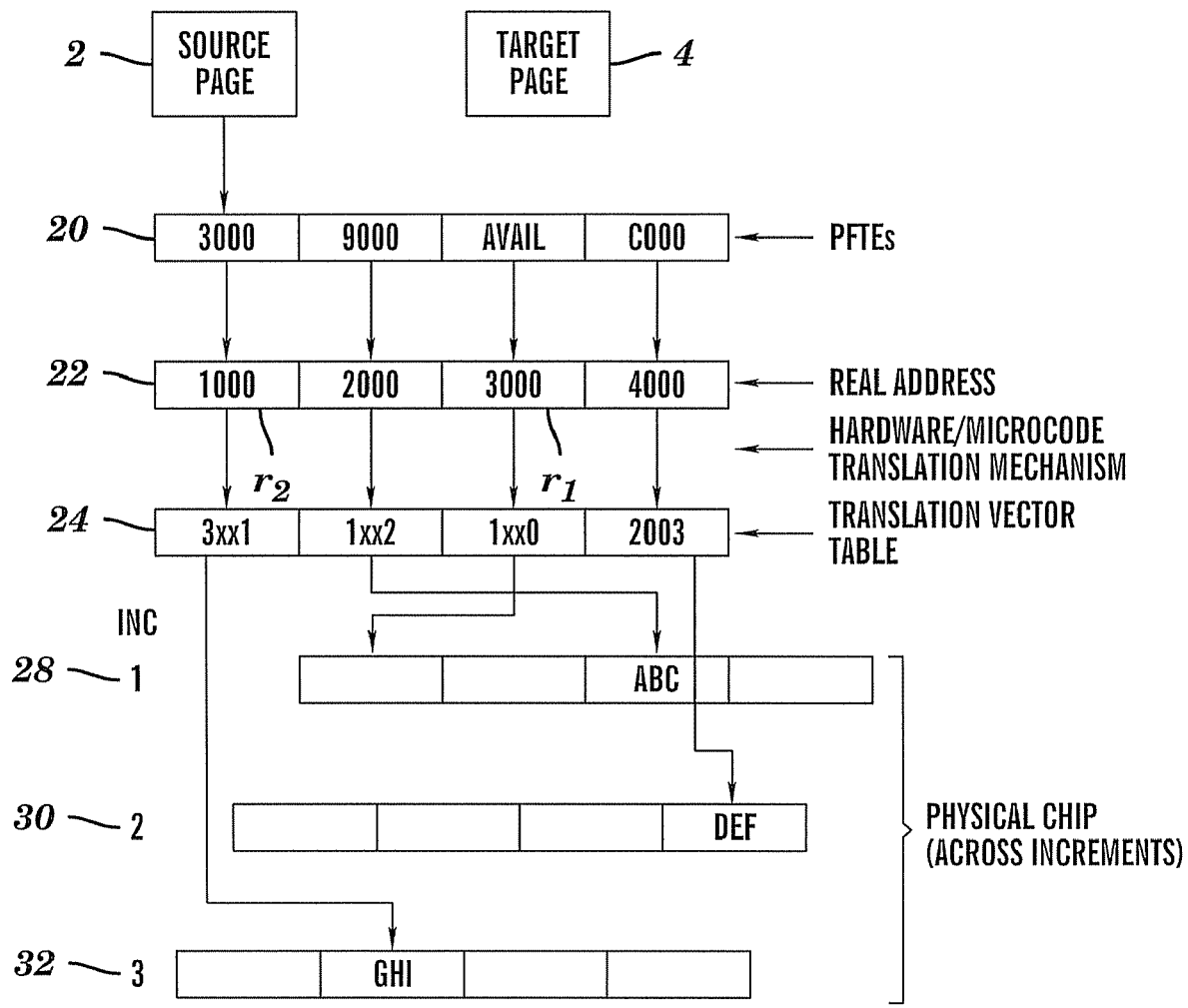
FIG. 2 illustrates a mechanism for reassigning real addresses from one physical chip location to another physical chip location at the real frame level as the structures may appear prior to the execution of the RRF instruction, according to the embodiments of the invention.
Figure 3:
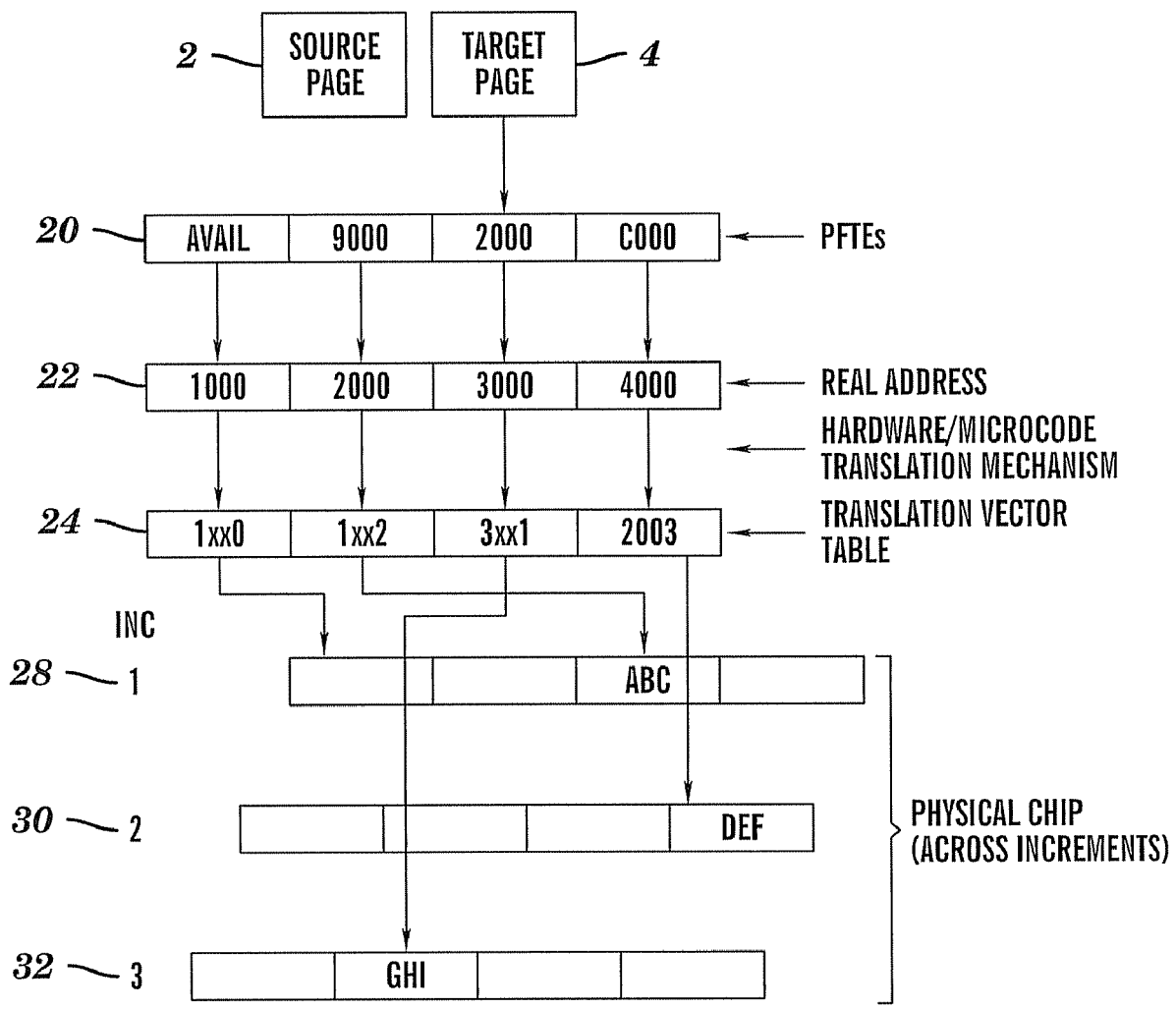
FIG. 3 illustrates a mechanism for reassigning real addresses from one physical chip location to another physical chip location at the real frame level according to the embodiments of the invention after RRF execution and cleanup.

FIG. 2 illustrates a scheme for reassigning real addresses from one physical chip location to another physical chip location at the real frame level according to the embodiments of the invention, using a translation vector table (TVT) implemented by a translation mechanism such as translation mechanism 508-1 (FIG. 8) or 508-2 (FIG. 9). FIG. 3 shows the status after REASSIGN REAL FRAME (RRF) execution and cleanup, discussed below. The operands of the RRF instruction are the contents of two general-purpose registers r1 and r2, where register r1 is the first operand location and register r2 is the second operand location. While the present invention is not limited to any particular instruction format, one possible format for the RRF instruction (the so-called RR format in z/Architecture) has an 8-bit opcode followed by two 4-bit register specifications r1 and r2, as shown below:

| Opcode | r1 | r2 |
| --- | --- | --- |

Contained within the first general purpose register (r1) is the real address into which the operating system wants the data to appear (target). The second general-purpose register (r2) contains the real address where the data resides prior to issuance of the instruction (source). Prior to RRF execution, real address 3000 is free to be allocated to any virtual page in the system. This is indicated in FIG. 2 by showing a corresponding PFTE of "Avail" for real address 3000 (meaning that no PFTE points to real address 3000 at this time). At that point the real frame translates through the translation vector table (TVT) to be described to physical location 1xx0. In the (TVT) entry "1xx0", the leftmost digit "1" specifies the physical increment the real frame is being mapped to, while the rightmost digit "0" (together with the intermediate digits "xx") indicates the displacement of the frame origin from the origin of the increment.

At some point prior to RRF execution, a virtual address becomes assigned (i.e., its PFTE is updated to point) to the target real page. FIG. 2 illustrates page frame table entries (PFTEs) 20, each of which corresponds to one page of data. Elements of FIG. 2 similar to elements of FIG. 1 will not be described. The states of the entries 20 are Avail (or empty), 9000, 2000 and C000, where each of these values is the corresponding virtual address if one exists and "Avail" if no corresponding virtual address exists. There is a one-to-one correspondence between the real frames 22 with addresses (1000, 2000, 3000, 4000) and the PFTE entries 20. Although for purposes of explanation the virtual addresses are shown in FIG. 2 as being contained in the PFTEs 20, it will be apparent to those skilled in the art (as well as from FIG. 6) that the virtual addresses are indices into the translation tables containing the PFTEs and that each PFTE contains a pointer to a corresponding real page; thus, virtual page 3000 indexes a PFTE containing a pointer to real page 1000, virtual page 9000 indexes a PFTE containing a pointer to real page 2000, and so on. Moreover, there is a one-to-one correspondence between the real addresses (1000, 2000, 3000, 4000) and the entries in a translation vector table 24 which contain pointers (3xx1, 1xx2, 1xx0 and 2003). Element 28 denotes a first physical storage increment assigned to the system, element 30 denotes a second physical storage increment assigned to the system, and element 32 denotes a third physical storage increment assigned to this system.

The mechanism of FIG. 2 is a processing mechanism for generating one or more real addresses associated with memory locations of a real memory system for reading and writing data. The real addresses (1000, 2000, 3000, 4000) are depicted as elements 22, which TVT 24 maps to specific memory locations in storage increments 28-32. The real addresses 22 and the PFTEs 20 are conceptually part of the real memory system.

The PFTEs 20, the real memory addresses 22, and the entries in translation vector table TVT 24 all correspond to real memory for storing data. Each of these elements (20, 22, entries in 24) can be considered as representing a page of data that are contiguous bytes of a physical memory.

FIG. 2 illustrates a new real address Translation Vector Table (TVT) 24 that would be a table of entries which are indexed to using that portion of the real address (corresponding to the page portion 904 shown in FIG. 9) following the lowest corresponding increment boundary and excluding the index into the frame (corresponding to the offset portion 804 shown in FIG. 9 and currently the rightmost 12 bits when using a 4096 byte page). The exact starting bit offset within the real address used in calculating the index is variable since the size of a storage increment is variable in any given machine, due to the increment size being based on the amount of installed physical central storage.

The translation vector table is a table of entries, wherein as noted above the entries are indexed to by a portion of the real address following a lowest increment boundary and excluding the index into a real frame, and wherein each of said entries of the second translation table has at least a chip increment location and a displacement to a frame boundary.

Also, the number of entries in this table is variable because it is based on the number of real frames contained in a storage increment. Each entry in the table is of sufficient size to contain the chip increment location and the displacement to the frame boundary (as shown in FIG. 9). There is one such table assigned to each real storage increment in the machine.

Given there is now a one-to-one correspondence between a real address (1000, 2000, 3000 and 4000) and a given chip location in increment pages 28, 30 and 32 within a physical increment, the TVT now injects itself as the one-to-one correspondence between its table entries and the real storage address as well as the physical increment.

The flow of a real frame reassignment is as follows. When the operating system determines it needs to move data from one real frame to another, it already has in place the mechanism to locate a second unused real frame (AVAIL) into which it can direct the data transfer. Once the two frames are obtained, the operating system's storage manager would issue a new instruction named REASSIGN REAL FRAME (RRF).

The input operands to the RRF instruction include general-purpose register numbers. Contained within the first general purpose register (r1) is the real address into which the operating system wants the data to appear (target or real address 3000). The second general-purpose register (r2) contains the real address where the data resides prior to issuance of the instruction (source or real address 1000).

Once the instruction is issued the microcode/hardware takes the real address in r2 and manipulates the real address (by analyzing it as shown in FIG. 9) to obtain the real address increment number. It then translates the real address increment number to obtain the TVT start location. Using the real address it manipulates the address to obtain the index into the TVT to obtain the entry that corresponds to the source real address (r2). The TVT corresponding to the source real address (r2) directs the microcode/hardware to index 1 of storage increment 3 (32), which contains data GHI.

With the source TVT entry located, the microcode/hardware takes the target real address in r1 and manipulates the real address to obtain the real address increment number. It then translates the real address increment number to obtain the TVT start location. Using the real address it manipulates the address to obtain the index into the TVT to obtain the entry that corresponds to the target real address (r1) in which the data ends up.

Elements of FIG. 3 similar to elements of FIGS. 1 and 2 will not be described. FIG. 3 illustrates a mechanism for reassigning real addresses from one physical chip location to another physical chip location at the real frame level according to the embodiments of the invention. This view represents the state changes from the initial view (FIG. 2) after execution of the RRF instruction.

Referring to FIG. 3, at this point, the entries in TVT 24 for both source 2 and target 4 have been located. The current contents of each TVT entry are then simply swapped. For instance, prior to execution of the RRF instruction (FIG. 2) the TVT 24 entry (1xx0) corresponding to real address 3000 (22) points to the location of page zero in physical increment 1 (28) and the TVT 24 entry (3xx1) corresponding to real address 1000 (22) points to the location of page 1 in physical increment 3 (32) and reveals data GHI. Following execution of the RRF instruction (FIG. 3) the contents of the TVT (24) entry corresponding to real address 3000 (22) have been exchanged with the contents of the TVT (24) entry corresponding to real address 1000 (22), thus revealing data GHI to real address 3000 (22). The TVT (24) entry corresponding to real address 1000 (22) is filled in with the pointer 1xx0, which causes real address 1000 to now translate to the page zero index of storage increment 1 (28). The PFTE representing real address 1000 (22) is then made available. All other TVT entries remain unchanged during the instruction execution.

Therefore, the table entry for the target real address points to the physical chip location at which the source data resides. Also, the table entry for the source real address points to the physical chip location that the target real address used to point to.

Figure 4:
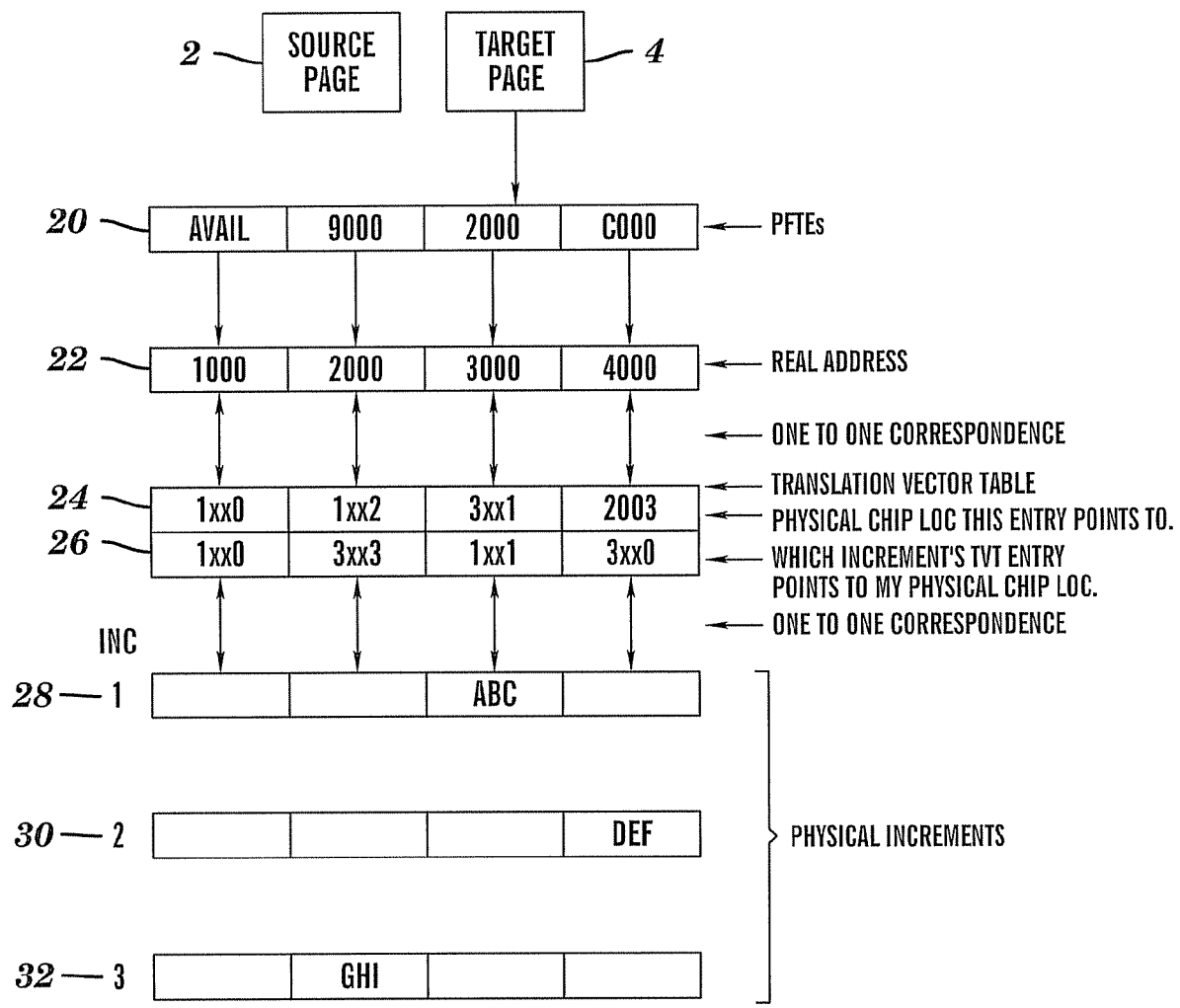
FIG. 4 illustrates a mechanism for reassigning real addresses from one physical chip location to another physical chip location at the real frame level according to the embodiments of the invention which supports reconfiguration of storage, after RRF execution and cleanup.

FIG. 4 illustrates a mechanism for reassigning real addresses from one physical chip location to another physical chip location at the real frame level according to the embodiments of the invention which supports reconfiguration of storage, after RRF execution and cleanup.

After having performed the RRF instruction, under normal circumstances, the operating system would simply free the old source real address 1000 and it would be available for reassignment to some other virtual page.

Eventually, the relationship between real address and physical chip location becomes highly randomized. In an operating system environment that supports dynamic central storage reconfiguration this randomization would be problematic given the fact that central storage is reconfigured by real address range which corresponds to sequential physical increment storage.

Therefore, on a central storage reconfiguration request the operating system must be able to know which real frames correspond to the physical location of which other real frame. By knowing this relationship the operating system can reassign the real frames of the two locations such that the real storage range can be restored to its original state of being represented by its initial physical increment.

Referring to FIG. 2, because the TVT 24 maintains a one-to-one correspondence between a real address (1000, 2000, 3000, 4000) and a physical chip location (e.g., ABC, DEF, GHI), a single TVT entry can be located by knowing the real address or by knowing the physical chip location. In the RRF execution diagrams and descriptions above with reference to FIGS. 2 and 3, the TVT entries were updated with only the physical location that the entry now points to. By expanding a table entry to include a second field 26 it is also possible to include, in the entry, which real address's/increment's TVT entry points (26) to this TVT entry's corresponding physical chip location. Because the RRF instruction always swaps two locations per execution this information is known at execution and can be saved in the TVT fields 26. TVT fields 26 are the inverse of fields 24. First fields 24 map a real address to get to the physical chip location. TVT second fields 26 map the physical chip location (increment and index) to the entry in first fields 24 that points to that physical chip location. In other words, first fields 24 translate top down in FIG. 4. Second fields 26 translate bottom up in FIG. 4. The TVT second fields 26 may reference TVT first fields through an index and increment format as shown in FIG. 4. To see how this works, consider the final assignment of real frames to physical chip locations shown in FIG. 3. For this purpose, the real frames corresponding to TVT 24 entries will be identified as frames 1xx0, 1xx1, 1xx2 and 1xx3, respectively; the address of real frame 1xx0, for example, may be thought of as having an increment portion 1 and a page portion xx0. As shown in that figure, the TVT 24 entries successively point to chip locations 1xx0, 1xx2, 3xx1 and 2003, as indicated by this correspondence table:

| Real Frame | Chip Location |
|---|---|
| 1xx0 | 1xx0 |
| 1xx1 | 1xx2 |
| 1xx2 | 3xx1 |
| 1xx3 | 2003 |

If the columns of the above table are swapped and the table is sorted by what is now the first column, the following table is obtained, containing the same information but indexed by the chip location rather than the real frame:

| Chip Location | Real Frame |
|---|---|
| 1xx0 | 1xx0 |
| 1xx2 | 1xx1 |
| 2003 | 1xx3 |
| 3xx1 | 1xx2 |

As shown in the first of the above tables, after RRF instruction execution real frame 1xx0 is assigned to chip location 1xx0 while real frame 1xx1 is assigned to chip location 1xx2. Equivalently, as shown in the second of the above tables, after RRF instruction execution chip location 1xx0 is assigned to real frame 1xx0 while chip location 1xx2 is assigned to chip location 1xx1. As shown in FIG. 4, this correspondence is indicated by a second field entry of 1xx0 for chip location 1xx0 (the first of the four entries shown) and a second field entry of 1xx1 for chip location 1xx2 (the third of the four entries shown). In a similar manner, the real frames assigned to chip locations 2003 and 3xx1 are indicated by corresponding second field entries in the TVTs (not shown) for increments 30 and 32. Finally, the TVT second field entries 3xx3 and 3xx0 for chip locations 1xx1 and 1xx3 (the second and fourth of the TVT second field entries shown in FIG. 4) are obtained from corresponding first field entries in the TVT (not shown) for increment 32.

Being able to translate both directions provides for reconfiguration to be able to undo the changes all of the RRF instruction executions have made in the event a physical memory increment is taken offline.

At reconfiguration time it would be a simple matter to query the service processor through a variation of the current service processor interfaces to obtain the real address which points to the physical chip location, which corresponds to the real address being taken offline.

Another way of obtaining the real address which points to this real address's corresponding physical chip location would be a variation of the RRF instruction itself such as having a bit in general purpose register 0 which signals instruction execution that this is a request to return the real address whose TVT entry points to the supplied real address's corresponding physical chip location.

With the returned real address in hand, the operating system's reconfiguration processor can issue the RRF to swap the two real addresses, returning the offline targeted real address's TVT entry to point to its original physical chip location.

Therefore, the embodiments of the invention disconnect two real addresses from their physical chip location and point each of the disconnected physical addresses to the other chips location. Moreover, the embodiments of the invention maintain a single copy of data for use by all processors. This is accomplished by what appears to be data movement when no data movement really occurs. In addition, the embodiments allow for the ability to remove physical storage from the computing environment.

Thus, according to the embodiments of the invention, the actual data of the pages involved in the operation are never accessed by the processor and therefore it is never required in the memory cache hierarchy, thus eliminating the cache damage normally associated with these page operations. Further the manipulation of the translation table involves reading and writing a few bytes to perform the operation as opposed to reading and writing the hundreds or thousands of bytes in the pages being manipulated.

Such a method and apparatus of the embodiments of the invention result in a significant savings in time to perform the actual operation and further represents a smaller performance impact on other activities of the processor. Preferably, the method and apparatus of the embodiments of the invention may be implemented in the design of the compressed memory management systems for server devices, PCs and the like, implementing compression/decompression algorithms.

As described above, the embodiments of the invention may be embodied in the form of computer-implemented processes and apparatuses for practicing those processes. Embodiments of the invention may also be embodied in the form of computer program code containing instructions embodied in tangible media, such as system memory, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic events.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

The invention claimed is:

1. A method for moving data between memory addresses in a computer system in which data referenced by the memory addresses is stored in physical memory, the method comprising:

providing a translation mechanism for mapping respective pages of contiguous memory addresses to corresponding locations in said physical memory in accordance with a specified mapping, whereby a first page of memory addresses is mapped to a first location in said physical memory and a second page of memory addresses is mapped to a second location in said physical memory; and changing said specified mapping of said translation mechanism to a new mapping in which said second page of memory addresses is mapped to said first location in said physical memory, thereby effectively moving said data stored at said first location from said first page of memory addresses to said second page of memory addresses without moving said data between locations in said physical memory;

wherein said translation mechanism comprises a table containing a plurality of entries, each of which is indexed by a memory address reference to one of said pages and specifies a particular location in said physical memory to which the page is mapped;

wherein said memory addresses each contain a first index portion identifying an increment and a second index portion identifying a page within said increment, said translation mechanism comprising:

a plurality of page tables corresponding respectively to said increments and each containing a plurality of entries, each of said table entries being indexed by said second index portion and specifying a particular increment in said physical memory and a particular location in said increment to which the page is mapped; and an increment table containing a plurality of entries, each of which is indexed by said first index portion and specifies a particular one of said page tables.

2. The method of claim 1 in which said new mapping maps said first page of memory addresses to said second location in said physical memory.

3. The method of claim 1 in which a first table entry specifies said first location in said physical memory and a second table entry specifies said second location in said physical memory, said changing comprising copying said first table entry into said second table entry.

4. The method of claim 3 in which the changing comprises swapping said first and second table entries.

5. The method of claim 1 in which each of said table entries is associated with an additional table entry that is indexed by a reference to a location in said physical memory and specifies a particular page of memory addresses that is mapped to said location.

6. The method of claim 1 in which said changing is performed in response to a program instruction specifying said first and second pages of memory addresses.

7. The method of claim 1 in which said physical memory comprises a plurality of increments, each of which contains a plurality of said locations.

8. The method of claim 1 in which said memory addresses are real memory addresses generated from virtual memory addresses provided by a program.

9. A computing system for performing data page operations, said computing system comprising:

a physical memory in which data referenced by memory addresses is stored;

a processing device for generating one or more real addresses associated with memory locations of the physical memory for reading and writing data;

a translation mechanism for mapping respective pages of contiguous memory addresses to corresponding locations in said physical memory in accordance with a specified mapping, whereby a first page of memory addresses is mapped to a first location in said physical memory and a second page of memory addresses is mapped to a second location in said physical memory;

the translation mechanism changing said specified mapping to a new mapping in which said second page of memory addresses is mapped to said first location in said physical memory, thereby effectively moving said data stored at said first location from said first page of memory addresses to said second page of memory addresses without moving said data between locations in said physical memory;

wherein said translation mechanism comprises a table containing a plurality of entries, each of which is indexed by a memory address reference to one of said pages and specifies a particular location in said physical memory to which the page is mapped;

wherein said memory addresses each contain a first index portion identifying an increment and a second index portion identifying a page within said increment, said translation mechanism comprising:

a plurality of page tables corresponding respectively to said increments and each containing a plurality of entries, each of said table entries being indexed by said second index portion and specifying a particular increment in said physical memory and a particular location in said increment to which the page is mapped; and an increment table containing a plurality of entries, each of which is indexed by said first index portion and specifies a particular one of said page tables.

10. The computing system of claim 9 in which said new mapping maps said first page of memory addresses to said second location in said physical memory.

11. The computing system of claim 9 in which a first table entry specifies said first location in said physical memory and a second table entry specifies said second location in said physical memory, said changing comprising copying said first table entry into said second table entry.

12. The computing system of claim 9 in which each of said table entries is associated with an additional table entry that is indexed by a reference to a location in said physical memory and specifies a particular page of memory addresses that is mapped to said location.

13. The computing system of claim 9 in which said changing is performed in response to a program instruction specifying said first and second pages of memory addresses.

14. The computing system of claim 9 in which said physical memory comprises a plurality of increments, each of which contains a plurality of said locations.

15. The computing system of claim 9 in which said memory addresses are real memory addresses generated from virtual memory addresses provided by a program.

16. A computer program product for moving data between memory addresses in a computer system in which data referenced by the memory addresses is stored in a physical memory, the computer program product comprising:

a computer readable storage medium; and program instructions stored on the computer readable storage medium for implementing:

providing a translation mechanism for mapping respective pages of contiguous memory addresses to corresponding locations in said physical memory in accordance with a specified mapping, whereby a first page of memory addresses is mapped to a first location in said physical memory and a second page of memory addresses is mapped to a second location in said physical memory; and changing said specified mapping of said translation mechanism to a new mapping in which said second page of memory addresses is mapped to said first location in said physical memory, thereby effectively moving said data stored at said first location from said first page of memory addresses to said second page of memory addresses without moving said data between locations in said physical memory;

wherein said translation mechanism comprises a table containing a plurality of entries, each of which is indexed by a memory address reference to one of said pages and specifies a particular location in said physical memory to which the page is mapped;

wherein said memory addresses each contain a first index portion identifying an increment and a second index portion identifying a page within said increment, said translation mechanism comprising:

a plurality of page tables corresponding respectively to said increments and each containing a plurality of entries, each of said table entries being indexed by said second index portion and specifying a particular increment in said physical memory and a particular location in said increment to which the page is mapped; and an increment table containing a plurality of entries, each of which is indexed by said first index portion and specifies a particular one of said page tables.

\* \* \* \* \*